(12) United States Patent
Parlamas et al.

(10) Patent No.: US 8,897,287 B2
(45) Date of Patent: *Nov. 25, 2014

(54) SYSTEM AND METHOD FOR PROCESSING A PLURALITY OF REQUESTS FOR A PLURALITY OF MULTI-MEDIA SERVICES

(71) Applicant: AT&T Intellectual Property II, L.P., Atlanta, GA (US)

(72) Inventors: Stephanie Parlamas, Colts Neck, NJ (US); Harish Samarasinghe, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/901,440

(22) Filed: May 23, 2013

(65) Prior Publication Data

US 2013/0250940 A1 Sep. 26, 2013

Related U.S. Application Data

(63) Continuation of application No. 12/831,078, filed on Jul. 6, 2010, now Pat. No. 8,451,820, which is a continuation of application No. 12/110,838, filed on Apr. 28, 2008, now Pat. No. 7,756,121, which is a continuation of application No. 10/294,855, filed on Nov. 14, 2002, now Pat. No. 7,366,159.

(51) Int. Cl.
*H04J 3/06* (2006.01)
*H04M 3/38* (2006.01)
*H04L 29/06* (2006.01)
*H04L 12/66* (2006.01)

(52) U.S. Cl.
CPC ............... *H04L 12/66* (2013.01); *H04M 3/382* (2013.01); *H04L 65/1053* (2013.01)
USPC ........... 370/350; 370/352; 370/354; 370/392; 370/395.52; 370/468

(58) Field of Classification Search
USPC ......... 370/350, 352, 353, 354, 355, 356, 392, 370/395.52, 468
See application file for complete search history.

(56) References Cited

U.S. PATENT DOCUMENTS

| | | | |
|---|---|---|---|
| 6,584,093 B1 * | 6/2003 | Salama et al. ................ | 370/351 |
| 6,714,987 B1 | 3/2004 | Amin et al. | |
| 6,765,912 B1 * | 7/2004 | Vuong ....................... | 370/395.2 |
| 6,856,676 B1 | 2/2005 | Pirot et al. | |
| 6,885,658 B1 * | 4/2005 | Ress et al. .................... | 370/352 |
| 6,910,074 B1 | 6/2005 | Amin et al. | |

(Continued)

*Primary Examiner* — Andrew Lai
*Assistant Examiner* — Andrew C Lee

(57) ABSTRACT

A system and method for processing a plurality of requests for a plurality of multi-media services received at a Private Service Exchange (PSX) defined on the system from a plurality of IP-communication devices. The system further includes a media server (MS) coupled to the PSX and to at least one IP Service Control Point (IP-SCP), which is operative to process the plurality of requests for the plurality of multi-media services. The IP-SCP further selectively directs the requests to the media server, which operates to form a preliminary multi-media communication path with a calling communication device. The MS further operates to play a plurality of announcements to the calling communication device over the preliminary multi-media communication path, as well as to collect caller-entered data from the calling communication device over the preliminary multi-media communication path.

20 Claims, 3 Drawing Sheets

(56) References Cited

U.S. PATENT DOCUMENTS

| | | | |
|---|---|---|---|
| 6,944,166 B1 * | 9/2005 | Perinpanathan et al. | 370/401 |
| 7,002,989 B2 * | 2/2006 | Agrawal et al. | 370/467 |
| 7,035,260 B1 * | 4/2006 | Betta et al. | 370/392 |
| 7,113,515 B2 | 9/2006 | Hoffman | |
| 7,274,684 B2 * | 9/2007 | Young et al. | 370/352 |
| 7,366,159 B1 | 4/2008 | Parlamas et al. | |
| 7,466,710 B1 * | 12/2008 | Clemm et al. | 370/401 |
| 7,756,121 B2 | 7/2010 | Parlamas et al. | |
| 8,451,820 B2 | 5/2013 | Parlamas et al. | |
| 2002/0026515 A1 | 2/2002 | Michielsens et al. | |
| 2002/0057786 A1 | 5/2002 | Donovan et al. | |
| 2002/0191596 A1 | 12/2002 | Moyano et al. | |
| 2003/0031165 A1 * | 2/2003 | O'Brien, Jr. | 370/352 |
| 2003/0147380 A1 * | 8/2003 | Hakuli | 370/352 |
| 2004/0022237 A1 * | 2/2004 | Elliott et al. | 370/356 |
| 2005/0021713 A1 * | 1/2005 | Dugan et al. | 709/223 |
| 2005/0157701 A1 | 7/2005 | Hoffmann et al. | |
| 2006/0168162 A1 * | 7/2006 | Woundy | 709/220 |

\* cited by examiner

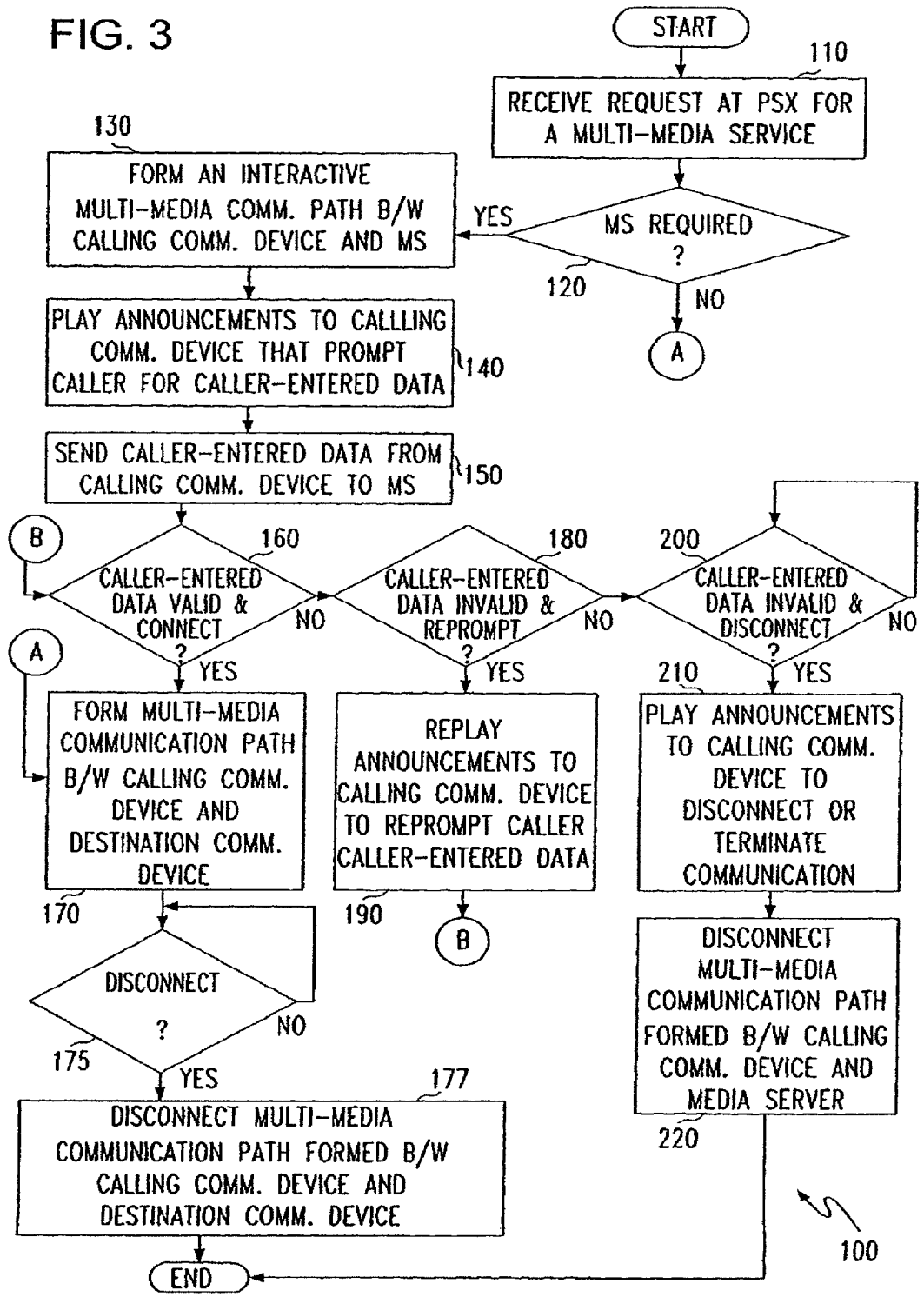

SYSTEM AND METHOD FOR PROCESSING A PLURALITY OF REQUESTS FOR A PLURALITY OF MULTI-MEDIA SERVICES

CROSS-REFERENCE TO RELATED APPLICATIONS

This application is a continuation of U.S. patent application Ser. No. 12/831,078, filed Jul. 6, 2010, which is currently allowed and which is a continuation of U.S. patent application Ser. No. 12/110,838, filed Apr. 28, 2008, now, U.S. Pat. No. 7,756,121, which is a continuation of U.S. patent application Ser. No. 10/294,855, filed Nov. 14, 2002, now, U.S. Pat. No. 7,366,159; all of which are herein incorporated by reference in their entirety.

FIELD OF THE INVENTION

The present invention relates generally to a system and method for processing a plurality of requests for a plurality of multi-media services and, more specifically, to a system and method for processing a plurality of requests for a plurality of multi-media services by selectively directing the requests to at least one media server for forming a preliminary multi-media communication path between the media server and a calling communication device to permit the media server to play announcements to and collect caller-entered data from the calling communication device.

BACKGROUND

Conventional methods for communicating information over Internet-based multi-media service provider systems, such as systems and services provided by AT&T, can require several Internet Protocols ("IP"), which are used for transporting media and/or control signal information over the multi-media service provider systems. Typically, a mixture of call signaling protocols, such as H.323, Media Gateway Control Protocol (MGCP), Hyper Text Transfer Protocol (HTTP) and proprietary protocols, are used for communicating the signal information between various components of the multi-media service provider systems.

Presently, Session Initiation Protocol (SIP) is becoming an increasingly popular protocol for transporting both standard and non-standard information in a common framework over Wide Area Networks (WANs). However, Local Area Networks (LANs) hosted by multi-media service providers continue to employ a mixture of call signaling protocols, as well as other proprietary protocols, which may be unique to each multi-media communication service provider system. However, each multi-media communication service provider system operating on a LAN is required to interface with SIP in order to communicate information over the WAN to SIP-enabled communication devices.

Furthermore, as multi-media communication service provider systems continue to offer additional services, there is a need to support preliminary multi-media communications with customers operating at the various SIP-enabled communication devices to collect caller-entered data and to process the caller-entered data to determine if the customer is authorized to receive a requested service.

Therefore, an unsolved need remains for a multi-media communication service provider system, which employs a mixture of call signaling protocols, that is adapted to provide a multi-media interface directly compatible with SIP for supporting preliminary multi-media communications between the multi-media communication service provider system and a number of SIP-enabled communication devices operating on the WAN.

SUMMARY OF THE INVENTION

In accordance with principles of the present invention, a system and method for processing a plurality of requests for a plurality of multi-media services received at a multi-media services provider system is set forth. The system processes the plurality of requests for the plurality of multi-media services by selectively directing the requests to at least one predetermined media server, which is located on the multi-media services provider system, for processing the requests based on predetermined attributes of the requests.

In one aspect of the present invention, the multi-media services provider system includes a gateway controller that is adapted to receive at least one request message in a first format for at least one multi-media service. The gateway controller is further adapted to translate the at least one request message in the first format into at least one request message in a second format. An IP-compatible switching device coupled to the gateway controller is adapted to receive the at least one request message in the second format and to translate the at least one request message in the second format into at least one request message in a third format. The system further includes a processor coupled to the switching device adapted to receive the at least one request message in the third format and to process the at least one request message in the third format to generate a media server instruction message in the third format. The switching device receives and translates the media server instruction message in the third format to a media server instruction message in the second format. The gateway controller receives and translates the media server instruction message in the second format to a media server instruction message in a fourth format. A media server, which is coupled to the gateway controller, receives and responds to the media server instruction message in the fourth format by forming a multi-media communication path with at least one communication device.

In another aspect of the present invention, the method for processing the plurality of requests for the plurality of multi-media services received at the multi-media services provider system includes receiving at least one request message in a first format for at least one multi-media service at a gateway controller located on the multi-media services provider system. The gateway controller translates the at least one request message in the first format into at least one request message in a second format. An IP-compatible switching device located on the multi-media services provider system receives the at least one request message in the second format and translates the at least one request message in the second format into at least one request message in a third format. A processor located on the multi-media services provider system receives the at least one request message in the third format and processes the at least one request message in the third format for generating a media server instruction message in the third format.

The IP-compatible switching device receives the media server instruction message in the third format and processes the media server instruction message in the third format to translate the media server instruction message into the second format. The gateway controller receives the media server instruction message in the second format. Further, the gateway controller is operative for mapping predetermined attributes of the media server instruction message in the second format into a media server instruction message in a fourth format. Thereafter, the gateway controller communicates the media server instruction message in the fourth format to a media server located on the multi-media services provider system. The media server responds to receipt of the media server instruction message in the fourth format by forming a multi-media communication path with at least one SIP enabled communication device.

In another aspect of the invention, the method further includes playing a predetermined announcement to the at least one communication device over the multi-media communication path. In response to the predetermined announcement, the at least one communication device can communicate caller-entered data to the media server. After receiving the caller-entered data, the media server can process the caller-entered data to generate a validation message in a fifth format, which includes the caller entered data. The media server can communicate the validation message in the fifth format to the processor. The processor receives and processes the validation message in the fifth format to validate the caller-entered data.

Depending on the outcome of the processing of the validation message in the fifth format by the processor, the processor can determine or declare the caller-entered data as having any one of a number of predetermined states. For example, the processor can declare the status of the caller-entered data as valid and connect. In this instance, the gateway controller is controlled to form a multi-media communication path between the at least one communication device and at least one other communication device.

In an exemplary embodiment, the processor can declare the caller-entered data as invalid, which requires a caller at the at least one communication device to be re-prompted to re-enter the caller-entered data. In this instance, the media server is controlled to re-play the predetermined announcement to the at least one communication device over the multi-media communication path. Further, the media server can receive the caller-entered data in response to the re-played predetermined announcement played to the at least one communication device. Thereafter, the above-described process of validating the caller-entered data at the processor may be repeated.

In yet another embodiment, the processor can declare the caller-entered data as invalid, which requires the at least one communication device to be disconnected from the system. In this instance, the media server is controlled to play a termination announcement to the at least one communication device over the multi-media communication path. Further, the media server may be controlled to disconnect the multi-media communication path formed between the media server and the at least one communication device.

In a further aspect of the invention, translating the at least one request message in the first format into the at least one request message in the second format, as described above, includes translating the at least one request message from an H.323 format to a Diameter-Plus format. In another aspect, translating the at least one request message in the second format into the at least one request message in the third format, as also described above, includes translating the at least one request message from a Diameter-Plus format to an Advanced-Intelligent-Network Transactions Capabilities format. In a similar aspect, generating the media server instruction message in the third format includes generating the media server instruction message in the Advanced-Intelligent-Network Transactions Capabilities format.

In yet another aspect of the invention, translating the predetermined attributes of the media server instruction message in the second format into a media server instruction message in the fourth format, as described above, includes translating the predetermined attributes of the media server instruction message in the Diameter-Plus format to a media server instruction message in a Session Initiation Protocol INVITE format.

BRIEF DESCRIPTION OF THE DRAWING

The foregoing and other objects of this invention, the various features thereof, as well as the invention itself, can be more fully understood from the following description, when read together with the accompanying drawings in which:

FIG. 3 is a high-level flow chart illustrating process steps executable on the system of FIG. 2.

DETAILED DESCRIPTION OF THE INVENTION

Figure 1:
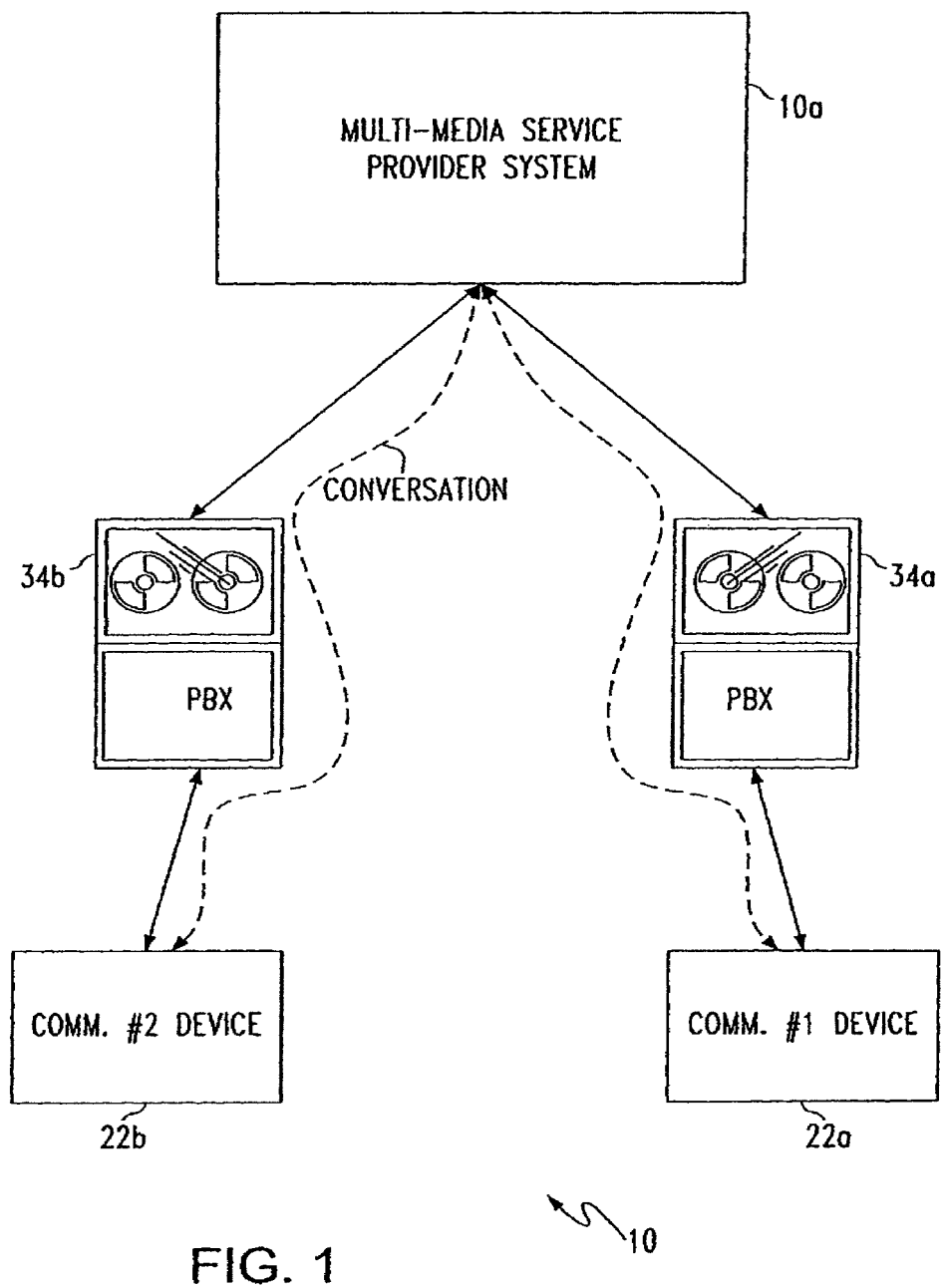
FIG. 1 is an exemplary high-level schematic block diagram of a system for providing multi-media communications between a plurality of communication devices according to the present invention.

FIG. 1 shows one embodiment of a communication network 10 for providing multi-media communications between at least first 22a and second 22b communication devices of a plurality of communication devices, in accordance with the present invention. The communication network 10 includes a multi-media provider system 10a, which is operative to provide a plurality of multi-media services to the first 22a and second 22b communication devices, via respective first 34a and second 34b IP-Private Branch Exchanges (hereinafter referred to as "PBXs"). It should be understood that the multi-media services provider system 10a is additionally operative to provide a plurality of multi-media services to a plurality of other communication devices not specifically shown herein.

Figure 2:
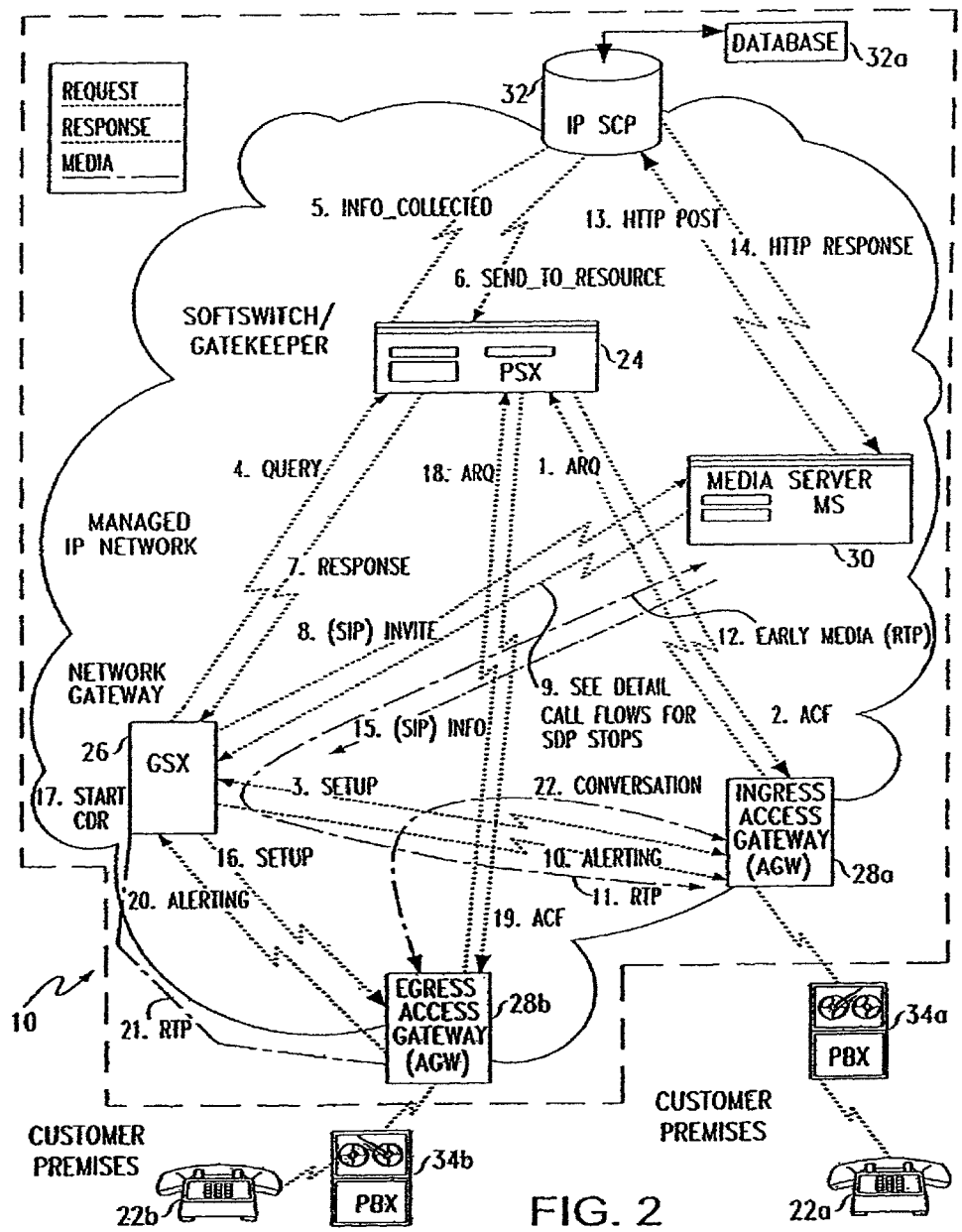
FIG. 2 is an expanded schematic block diagram of the system shown in FIG. 1.

Referring to FIG. 2, in the exemplary embodiment, the multi-media services provider system 10a includes a centrally located Softswitch/Gatekeeper or Private Service Exchange 24 (hereinafter referred to as "PSX"), at least one Media Server ("MS") 30, at least one Internet-Protocol Service Control Point 32 (hereinafter referred to as "IP-SCP"), at least one Network Gateway (hereinafter "GSX") 26 and a plurality of routers, such as first 28a and second 28b routers. The PSX 24 is coupled to the at least one IP-SCP 32, the GSX 26 and to the first 28a and second 28b routers of the plurality of routers. The MS 30 is coupled to the IP-SCP 32 and to the GSX 26. The GSX 26 is coupled to the first 28a and second 28b routers.

In the exemplary embodiment, the first router 28a is coupled to the first communication device 22a, via the first PBX 34a. Further, the second router 28b is similarly coupled to the second communication device, via the second IP-PBX 34b.

The PSX 24, for example, can be provided by Sonus Networks of Westford, Mass. The PSX 24 is adapted to operate using an Advanced-Intelligent-Network Transactions Capabilities protocol or format (i.e., "AIN TCAP format," which is referred to hereinafter as "TCAP") over a Transport Adapter Layer Interface (hereinafter referred to as "TALI"), which is employed as the signaling interface between the PSX 24 and the IP-SCP 32. The information received at the PSX 24, via a Query message received from the GSX 26, is mapped to the TCAP Info_Collected message and passed to the IP-SCP 32 for feature processing. Depending on the outcome of the IP-SCP processing, the IP-SCP may send one or more predefined instructions to the PSX, via one or more TCAP messages, such as an Analyze_Route or Send_To_Resource, which will be described in further detail below.

In the exemplary embodiment, the GSX 26 can be provided by Sonus Networks of Westford, Mass. In one embodiment, the GSX 26 uses an H.323 protocol for establishing multi-media sessions between the first 22a and second 22b communication devices, via the first router 28a and first PBX associated with the first communication device 22a, and via the second router 28b and second PBX associated with the second communication device 22b. In one embodiment, the GSX 26 further includes Session Initiation Protocol ("SIP") as the signaling protocol for interfacing with the MS 30. Thus, the GSX 26 supports the SIP stack in addition to supporting the H.323 stack. Whenever the GSX 26 receives a response from the PSX 24 containing the IP address of the MS 30, the GSX 26 formulates a SIP INVITE message with the information received from the PSX 24 and forwards the SIP INVITE message to the MS 30, which will be described in further detail below.

The GSX 26 further uses H.450-2 protocol for providing call transfer capabilities, which connects an initial caller operating at the first communication device 22a, for example, and a called party operating at the second communication device 22b, for example, after obtaining the necessary information to process the call. The GSX 26 further maintains call state information associated with the communication between the initial caller and the called party.

The first router 28a and the second router 28b can each include a conventional router, such as a "Cisco 12000," available from Cisco Corporation of San Jose, Calif. The routers 28a and 28b are adapted to receive a plurality of requests for multi-media services from the first 22a and second 22b communication devices, respectively, and to redirect the requests to the PSX 24 for further processing, which will be described below in further detail.

In the exemplary embodiment, the IP-SCP 32 can include a conventional computer server, such as an "NT-Server," which can be provided by Microsoft of Richmond, Wash., or a "Unix Solaris Server," which can be provided by Sun Micro Systems of Palo Alto, Calif. The IP-SCPs 32 can be programmed with conventional Web-page interface software such as: "Visual Basic," "Java," "JavaScript," "HTML/DHTML," "C++," "J+," "Perl," or "Perlscript," and "ASP." The IP-SCPs 32 can further be programmed with an operating system, Web server software and Web Application software, such as an e-commerce application and computer network interface software. In addition, the IP-SCP 32 can be programmed with multi-media service software adapted to provide a plurality of multi-media services, as is known, such as 115DN telecommunication service, "Click-to-Dial," Video Conferencing," "Virtual Private Networks," and "Toll-Free Calling or 800-Service."

The IP-SCP 32 can be further coupled to a database 32a, which contains a service intelligence layer adapted for providing the plurality of multi-media services described above. The intelligence layer may include customer logic and data, as well as common logic and data that is used by communication devices 22a, 22b, as well as a plurality of other communication devices not specifically shown in FIG. 2.

The first 22a and second 22b communication devices can include a plurality of SIP-enabled devices, such as telephones, personal computers and IP-Private Branch Exchanges ("IP-PBXs"). In addition, the first 22a and second 22b communication devices can include a plurality of SIP-enabled wireless devices, such as cellular telephones, pagers and personal digital assistants ("PDAs").

In the exemplary embodiment, the multi-media services provider system 10a uses an HTTP protocol as the signaling protocol between the MS 30 and IP-SCP 32, which operates to communicate caller-entered data from the MS 30 to the IP-SCP 32. The HTTP protocol is suited for the transfer of caller-entered data, and even customer logic in the form of VoiceXML scripts, which provides the flexibility to offer advanced features to the caller, such as playing service specific announcements and/or collecting caller-entered data. In addition, HTTP provides a simpler interface than SIP and therefore, HTTP places less demand on real-time resources at the MS 30 and IP-SCP 32. In the exemplary embodiment, the caller-entered data is communicated from the MS 30 to the IP-SCP 32 using an HTTP form POST message.

The HTTP form POST message, for example, includes a body portion having a Caller-Entered Data parameter representing a status of the caller-entered data. More specifically, upon collecting the input from the end caller, the MS 30 creates the Caller-Entered Data parameter in the HTTP form POST message. The IP-SCP 32 can receive and process the HTTP form POST message having the Caller-Entered Data parameter by changing a value of the Caller-Entered Data parameter to indicate to the MS 30 whether or not the caller-entered data is valid and what action should be executed.

The Caller-Entered Data parameter serves to at least pass caller-entered data to the IP-SCP 32, to provide an indicator to the IP-SCP to bypass the initial part of customer logic and continue with the logic for validating caller-entered data and to provide an indicator to the MS 30 as to which action should be executed after the IP-SCP has validated the caller-entered data.

In the exemplary embodiment, the Caller-Entered Data parameter contains the following fields: Parameter Name—Caller-Entered Data, Parameter Length, Action field and Caller-Entered Data field. In one embodiment, the Action field of the Caller-Entered Data parameter may have one of the following four values: "Validate Caller-Entered Data," "Valid and Connect," "Invalid and Re-prompt" and "Invalid and Disconnect."

The Validate Caller-Entered Data may be set by the MS 30 and sent to the IP-SCP 32 after the MS 30 collects information from the end-caller at the second communication device 22b, for example. By setting the Action field to this value, the MS 30 passes the caller-entered data to the IP-SCP 32 and requests that the data be validated by the IP-SCP 32. The Valid and Connect may also be set by the IP-SCP 32 and sent to the MS 30 after the IP-SCP 32 has examined the caller-entered data. If the IP-SCP 32 determines that the caller-entered data is valid and that the call should be connected based on the routing number returned by the IP-SCP 32, then the IP-SCP 32 sets the Action field to the valid and connect value. The Invalid and Re-prompt value may also be set by the IP-SCP 32 and sent to the MS 30 after the IP-SCP 32 has examined the caller-entered data. If the IP-SCP 32 determines that the caller-entered data is invalid or incorrect and that the MS 30 should re-prompt the caller, then the IP-SCP 32 sets the Action field to the Invalid and Re-prompt value and also sends the appropriate announcement ID to the MS 30. The Invalid and Disconnect value may also be set by the IP-SCP 32 and sent to the MS 30 after the IP-SCP 32 has examined the caller-entered data. If the IP-SCP determines that the caller-entered data is invalid and that the MS 30 should disconnect the call, then the IP-SCP 32 sets the Action field to the Invalid and Disconnect value.

The MS 30, in the exemplary embodiment, is operative to provide a plurality of predetermined announcements to the communication devices 22a, 22b and to collect information from the communication devices 22*a*, 22*b* (e.g., caller-entered data). For example, if the caller is required to enter digits or a phrase for Call Prompter service or SDN service, the MS 30 will play the announcement prompting the caller to enter the required information. The MS 30 also collects the information entered by the caller. The MS 30 plays the announcements to the caller based on the instructions and an announcement ID returned from the IP-SCP 32 to the MS 30. The announcements can be "Service Terminating" announcements or announcements for the caller to enter an authorization code, account code, or "call-prompter" digits.

When the MS 30 receives an INVITE message from the GSX 26, the MS 30 accesses predetermined resources, such as announcement frames, voice recognition frames and/or Dual Tone Multi-Frequency (DTMF) receivers for establishing a SIP session with the GSX 26 (e.g. media path). Once the media path has been established between the caller operating from the first communication device 22*a*, for example, the MS 30 plays the appropriate announcement and collects the necessary caller information from the first communication device 22*a*, under the control of the GSX 26. After the MS 30 collects caller information, the MS 30 passes the caller information to the IP-SCP 32 for validation and for receipt of further instructions from the IP-SCP 32 for processing the call. As described above, this is accomplished through an HTTP form POST message communicated from the MS 30 to the IP-SCP 32 and through a Response message communicated from the IP-SCP 32 to the MS 30.

In an exemplary embodiment, the HTTP form POST message sent by the MS 30 to the IP-SCP 32 can contain the Caller-Entered Data parameter with the caller-entered data and an Action field equal to Validate Caller-Entered Data. When the IP-SCP 32 receives the HTTP form POST message and receives the Caller-Entered Data parameter with an Action field equal to Validate Caller-Entered Data, as described above, the IP-SCP 32 accesses the appropriate logic to validate the data and to provide further instructions to the MS 30. The response to the MS 30 from the IP-SCP 32 contains the Caller-Entered Data parameter with an Action field equal to any one of the four values described above.

For example, if the MS 30 receives a Caller-Entered Data Parameter having an Action field equal to "Valid and Connect," the MS 30 sends the destination numbers (may be multiple destination numbers) that it received from the IP-SCP 32 to the GSX 26 through an INFO message. The MS 30 also sends in the INFO message any billing information that it received from the IP-SCP 32.

In another example, if the MS 30 receives a Caller-Entered Data Parameter having an Action field equal to "Invalid and Re-prompt," the MS 30 plays the announcement to the caller specified by the IP-SCP 32 and collects the caller-entered data. Further, the MS 30 formats the caller-entered digits and sends this data to the IP-SCP 32 through an HTTP form POST message with the Caller-Entered Data parameter equal to "Validate Caller Data." The MS 30 should also re-send the Transaction ID.

In yet another example, if the MS 30 receives a Caller-Entered Data Parameter having an Action field equal to "Invalid and Disconnect," the MS 30 plays the announcement to the caller specified by the IP-SCP 32 and sends an INFO message with instructions to the GSX to "Disconnect" the call due to unauthorized call attempts or time-out. The MS 30 also sends in the INFO message to the GSX 26 with any billing information that it received from the IP-SCP 32. The GSX 26 sends "BYE" messages to the MS 30 to disconnect the sessions, and the GSX also sends an H.225 message to the Ingress Access Gateway 28*a* to disconnect the caller operating at the first communication device 22*a*, for example.

Referring further to FIG. 3, there is shown an exemplary call flow diagram for executing the method 100 on the communication network 10 of FIG. 2 to provide multi-media services between the first 22*a* and second 22*b* communication devices, in accordance with the present invention. The call flow described in the exemplary call flow diagram provides a generic call flow in the communication network 10 with several different protocols employed at various locations of the communication network 10, where generally the PSX 24 queries the IP-SCP 32, and the IP-SCP 32 indicates that resources at the MS 30 are required. Further, the PSX 24 sends this information back to the GSX 26, so that the GSX 26 can attempt to connect the MS 30 to the caller residing at either of the communication devices 22*a*, 22*b* using the SIP protocol between the MS 30 and the GSX 26 and by using the H.323 protocol between the GSX 26 and the calling communication device 22*a* or 22*b*. Additionally, the MS 30 will communicate with the IP-SCP 32 using the HTTP protocol to validate the caller-entered data.

The method commences, at step 110, by the PSX 24 receiving a request for a multi-media service from a caller operating at a calling or first communication device 22*a*, for example. More specifically, the caller operating at the first communication device 22*a* dials an SDN On-Net or Off-Net number, which first arrives at the PBX 34*a*. Based on the signaling interface, such as Channel Associated Signaling (CAS) or Integrated Service Digital Network Primary Rate Interface (ISDN-PRI), which provides transparent end-to-end digital connectivity to the first PBX 34*a*, the first PBX 34*a* can route the call to any one of a plurality of locations.

For example, if the call arrives at the first PBX 34*a* in the CAS interface, the first PBX 34*a* routes the call to the first router 28*a*, which is hereinafter defined as an ingress Access Gateway ("AGW") 28*a*. The call arrives at the ingress AGW 28*a* with the Called Party Number, which can be associated with the second communication device 22*b*, for example, along with other various information received in the call or inband-signaling message. Alternatively, if the call arrives at the first PBX 34*a* in the ISDN-PRI interface, the first PBX 34*a* routes the call to the ingress AGW 28*a* by sending a Q.931 Setup message to the GSX 26, which contains Bearer Capability (e.g. 3.1 kHz audio), Channel Identification, and the Called Party Number. The Setup message may include predetermined information, such as Network-Specific Facilities, and Calling Party Number (including presentation indicator).

Furthermore, the ingress AGW 28*a* formulates an ARQ message in the H.323 protocol with relevant data (e.g., Calling Party Number, Called Party Number) and sends the ARQ message to the PSX 24, as shown by line 1 on FIG. 2. Upon receiving the ARQ message at the PSX, the PSX sends an ACF message in the H.323 protocol to the ingress AGW 28*a* directing the ingress AGW 28*a* to route the call to the GSX 26 assigned to the ingress AGW 28*a*, via provisioning, as shown by line 2 on FIG. 2. Upon receiving the ACF message, the ingress AGW sends a Setup message in the H.225 protocol (requesting Fast Start) to the GSX 26 with predefined parameters, as shown by line 3 on FIG. 2. The GSX 26 sends a Query message to the PSX 24 in a Diameter-Plus protocol, for example, which is a proprietary protocol of Sonus Networks of Westford, Mass., with all relevant data mapped from the Setup message received from the ingress AGW 28*a*, as shown by line 4 on FIG. 2.

Upon receiving the Query message, the PSX 24 performs pre-query processing on the called party number which includes validating the dialed number and checking for escape codes. In this scenario, the call passes number validation and does not escape. If the number is 7 digits, the PSX 24 sets the collected address parameter in the Info_Collected message as NPT=ISDN and NoN=Subscriber Number, where NPT is defined as a Numbering Plan Type, ISDN is defined as an Integrated Services Digital Network and NoN is defined as a Nature of Number. If the number is ten digits, then the NPT=ISDN and the NoN=National; and if the prefix is 011, then the NoN=International and the NPT=ISDN. Furthermore, the PSX 24 maps the collected parameters and provisioned data (e.g., Called Party Number and charge number) into an Info_Collected message which is formulated by the PSX 24. Thereafter, the PSX 24 routes the Info_Collected message to the IP-SCP 32, as shown by line 5 on FIG. 2.

The IP-SCP 32 receives the Info_Collected message and accesses the ANI translation table that maps the charge number to a customer record ID. Using the Customer ID from the ANI translation table, the IP-SCP 32 application accesses the customer record and executes customer logic. The customer logic applies appropriate screening and feature processing for the call. At step 120, if the IP-SCP 32 determines that caller interaction is not required, the IP-SCP 32 provides an Analyze_Route message to the PSX 24 and the content thereof is mapped into a Response Message, which is forwarded to the GSX 26 and the method 100 is accelerated to step 170.

In the exemplary call flow, the IP-SCP 32 determines that caller interaction is necessary based on the caller's customer logic, which is located on the IP-SCP 32. The customer logic instructs the IP-SCP 32 to play an announcement and collect digits.

At step 130, the IP-SCP 32 formulates a Send_toResource message, which includes instructions for forming an interactive multi-media communication path between the MS 30 and the calling or first communication device 22a. Thereafter, the IP-SCP 32 sends the Send_To_Resource message to the PSX 24 for processing, as shown by line 6 on FIG. 2. In the exemplary embodiment, the Send_To_Resource message can include at least the following information:

■ Package Type = Conversation with Permission to Release
Component Type = Invoke(Last)
    Operation = SendToResource
    Parameters
    - ResourceType = FlexParameterBlock
    - StrParameter Block = FlexParameterBlock
    - IPResourceType = PlayAnnouncements & CollectDigits
    - IPStrParameterBlock = AnnouncementDigitBlock
    - Destination Address = MS IP address
    - IP-SCP IP address
    - Transaction ID
Component Type = Invoke(last)
    Operation = Furnish_AMA Upon receiving the Send_To_Resource message from the IP-SCP 32 and depending on the MS 30 address received in the "Destination Address" field of the Send_To_Resource message without performing delete/prefix rule, the PSX 24 copies the information contained in the Send_To_Resource message into a Response message. Further, the PSX 24 sends the Response message to the GSX 26 for further processing, as shown by line 7 on FIG. 2.

Upon receipt of the Response message which is formulated in the proprietary protocol of Sonus networks described above, the GSX 26 performs one or more of a number of actions. For example, based on the MS 30 address received in the "Destination Address," the GSX 26 constructs a SIP INVITE message with a "To" field containing the IP address of the MS 30 and a "From" field containing the IP address of the GSX. Furthermore, the GSX 26 also populates the message body of the INVITE message with information such as ResourceType=FlexParameterBlock and StrParameter Block=FlexParameterBlock, which the GSX 26 received in the Response message received from the PSX 24 along with the instructions to play the announcement associated with the given announcement ID. The GSX 26 also creates a Call Detail Record ("CDR") for this call.

After the MS 30 receives the SIP INVITE message from the GSX 26, as shown by line 8 on FIG. 2, the MS 30 returns a 183-Session Progress with its SDP information to the GSX 26, as shown by line 9 on FIG. 2. Upon receiving the 183-Session Progress, the GSX 26 performs the SIP to H.323 inter-working and sends a H.225 Alerting message to the caller with the SDP information that the GSX 26 received from the MS 30, as shown by line 10 on FIG. 2. At this point, the caller at the first communication device 22a, for example, and the MS 30 can communicate with the ingress AGW 28a for resource reservation using Resource Reservation Protocol-Traffic Engineering (RSVP-TE). Thus, a channel is shown between the ingress AGW 28a and the MS 30, as shown by lines 11 and 12 on FIG. 2. At this instant and consistent with step 130, a multi-media path is formed between the first communication device 22a and the MS 30, via the GSX 26, ingress AGW 28a and first PBX 34a.

At step 140, the MS 30 can now play a plurality of announcements to the caller at the first communication device 22a based on the announcement ID. In response, the caller at the first communication device 22a can enter caller-entered data, at step 150, such as a digitized authorization code. The MS 30 receives the digitized authorization code and formats the code for subsequent communication to the IP-SCP 32.

At step 160, the MS 30 sends the caller-entered data to the IP-SCP 32, which processes attributes of the caller-entered data in conjunction with data previously stored in the database 32a associated with the IP-SCP 32. In order to communicate the caller-entered data to the IP-SCP 32 for validation, the MS 30 initiates an HTTP session with the IP-SCP 32 by generating an HTTP form POST message. In the exemplary embodiment, the HTTP form POST message can include the caller-entered data and the Caller-Entered Data Parameter with the Action Field equal to "Validate Caller-Entered Data." Further, the HTTP form POST message can include the transaction identifier ("ID") of the IP-SCP 32 and call processing logic associated with this call, which the MS 30 received in the INVITE message provided earlier by the GSX 26.

The IP-SCP 32 receives the HTTP form POST message from the MS 30, as shown by line 13 on FIG. 2, which can include the Caller-Entered Data Parameter having the Action Field set to "Validate Caller-Entered Data." Further, the IP-SCP 32 uses the transaction ID included in the HTTP form POST message to bypass the initial processing of the Customer Account Logic and execute the appropriate data validation logic. After executing the customer logic, the IP-SCP 32 sends the MS 30 an HTTP Response message (e.g., 200 OK message), as shown by line 14 on FIG. 2. The HTTP Response message contains the Caller-Entered Data Parameter with the Action Field set appropriately, billing information and, depending on whether or not the call is to be routed, one or more destination addresses to route the call. It should be understood that the MS 30 saves a copy of the transaction ID, so that the IP-SCP 32 does not need to send the transaction ID back to the MS 30.

Based on the value of the "Caller-Entered Data Parameter" returned from the IP-SCP 32, the MS 30 can perform one or more predefined operations. For example, again at step 160, if the Caller-Entered Data Parameter contains an Action field equal to "Valid and Connect," the MS 30 generates an INFO message and sends the INFO message to the GSX 26 with the routing numbers and billing information returned from the IP-SCP 32, as well as other appropriate information, which is included in the body of the INFO message, as shown by line 15 on FIG. 2. Upon receiving the INFO message, the GSX 26 sends a BYE message to the MS 30 and disconnects the call leg formed between the GSX 26 and the MS 30.

At step 170, the GSX 26 operates to form a multi-media communication path between the calling or first communication device 22a and the called or second communication device 22b. In order for the GSX 26 to form the multi-media communication path between the first 22a and second 22b communication devices, the GSX 26 generates an H.225 Setup message (requesting Fast Start), which is sent to the egress AGW 28b with the destination address that the GSX 26 received in the INFO message, as shown by line 16 on FIG. 2. The GSX 26 creates a start CDR 17. The egress AGW 28b forwards the H.225 Setup message to the called party at the second communication device 22b, for example, via the PBX 34b, with the SDP information of the caller residing at the first communication device 22a.

Upon receiving the H.225 Setup message, the egress AGW 28b sends an H.323 ARQ message to the PSX 24 to determine whether permission has been granted to set up the call, as shown by line 18 on FIG. 2. In the exemplary embodiment, the PSX 24 recognizes that this ARQ message is from the egress AGW 28B and sends an ACF message back to the egress AGW 28b granting permission to proceed with the call, as shown by line 19 on FIG. 2. The egress AGW 28b sends the call to the called entity or second communication device 22b, for example, using the appropriate in-band protocol or Setup message with CPN if available for Integrated Service Digital Network Primary Rate Interface (ISDN-PRI). Thereafter, the egress AGW 28b sends an H.225 Alerting message to the GSX 26, as shown by line 20 on FIG. 2. The RTP/RTCP channel is opened between the egress AGW 28b and the GSX 26, as shown by line 21 on FIG. 2. The GSX 26 uses the H.450-2 transfer capability to connect the calling party at the first communication device 22a and the called party at the second communication device 22b for example, as shown by conversation line 22 on FIG. 2.

At step 175, an H.225 Release message is received by the GSX 26 from either the first 22a and second 22b communication devices, which triggers the GSX 26 to disconnect the call. At step 177, in response to receipt of the H.225 Release message, the GSX disconnects the multi-media path previously formed between the first 22a and second 22b communication devices and the method 100 ends at step 230.

At step 180, if the Caller-Entered Data Parameter contains an Action field equal to "Invalid and Re-prompt," the MS 30 plays a predefined announcement to the calling party and recollects the user-entered data, at step 190. The MS 30 receives the user-entered data and processes the user-entered data, as similarly described above at step 160, for subsequent communication to the IP-SCP 32 for caller-entered data validation.

At step 200, if the Caller-Entered Data Parameter contains an Action field equal to "Invalid and Disconnect," the MS 30 plays final handling announcements to the calling party at the first communication device 22a, at step 210. The MS generates an INFO message and sends the INFO message to the GSX 26. The body of the INFO message contains the billing information and instructions to disconnect the call. Upon receiving the INFO message, the GSX 26 sends a BYE message to the MS 30 and disconnects the call leg formed between the GSX 26 and the MS 30. Based on the billing information received in the INFO message, the GSX 26 creates a stop CDR. At step 220, the GSX 26 also sends a Release message to the caller at the first communication device 22a and disconnects the call leg formed between the GSX 26 and the calling party operating at the first communication device 22a.

While various features of the present invention are described herein in conjunction with exemplary embodiments having various components using a number of protocols, it should be understood that other suitable components and protocols can be used without departing from the present invention.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method of processing a multi-media service request, comprising:
   receiving, by a processor, a request message in a third format and processing the request message in the third format at the processor for generating a media server instruction message in the third format, wherein a gateway controller has received the request message in a first format for a multi-media service and translated the request message in the first format into a request message in a second format, and wherein a switching device has received the request message in the second format and translated the request message in the second format into the request message in the third format; and
   transmitting, by the processor, the media server instruction message in the third format to the switching device for enabling the switching device to translate the media server instruction message into the second format, and to forward the media server instruction message in the second format to the gateway controller for enabling the gateway controller to map an attribute of the media server instruction message in the second format into a media server instruction message in a fourth format, where the media server instruction message in the fourth format is destined to a media server for forming a multi-media communication path with a communication device at a customer premises.

2. The method of claim 1, wherein an announcement is played to the communication device over the multi-media communication path.

3. The method of claim 1, wherein the translating the request message in the first format into the request message in the second format includes translating the request message from an H.323 format to a diameter-plus format.

4. The method of claim 1, wherein the translating the request message in the second format into the request message in the third format includes translating the request message from a diameter-plus format to an advanced intelligent network transactions capabilities format.

5. The method of claim 1, wherein the generating the media server instruction message in the third format includes generating the media server instruction message in an advanced intelligent network transactions capabilities format.

6. The method of claim 1, wherein the translating the attribute of the media server instruction message in the second format into a media server instruction message in the fourth format includes translating the attribute of the media server instruction message in diameter-plus format to a media server instruction message in a session initiation protocol invite format.

7. The method of claim 2, wherein caller-entered data is received at the media server in response to the announcement.

8. The method of claim 7, wherein the caller-entered data is processed at the media server to generate a validation message in a fifth format and including the caller-entered data.

9. The method of claim 8, further comprising:
receiving the validation message in the fifth format at the processor to validate the caller-entered data.

10. The method of claim 9, further comprising:
declaring the caller-entered data as valid and connect; and
controlling the gateway controller to form a multi-media communication path between the communication device and one other communication device.

11. The method of claim 10, wherein the controlling the gateway controller causes a conference call protocol to be executed at the gateway controller to form the multi-media communication path between the communication device and the one other communication device.

12. The method of claim 11, wherein the conference call protocol includes an H.450-2 call transfer capability.

13. An apparatus for processing a multi-media service request, comprising:
a processor; and
a computer-readable medium storing a plurality of instructions which, when executed by the processor, cause the processor to perform operations, the operations comprising:
receiving a request message in a third format and processing the request message in the third format for generating a media server instruction message in the third format, wherein a gateway controller has received the request message in a first format for a multi-media service and translated the request message in the first format into a request message in a second format, and wherein a switching device has received the request message in the second format and translated the request message in the second format into the request message in the third format; and
transmitting the media server instruction message in the third format to the switching device for enabling the switching device to translate the media server instruction message into the second format, and to forward the media server instruction message in the second format to the gateway controller for enabling the gateway controller to map an attribute of the media server instruction message in the second format into a media server instruction message in a fourth format, where the media server instruction message in the fourth format is destined to a media server for forming a multi-media communication path with a communication device at a customer premises.

14. The apparatus of claim 13, wherein an announcement is played to the communication device over the multi-media communication path.

15. The apparatus of claim 13, wherein the translating the request message in the first format into the request message in the second format includes translating the request message from an H.323 format to a diameter-plus format.

16. The apparatus of claim 13, wherein the translating the request message in the second format into the request message in the third format includes translating the request message from a diameter-plus format to an advanced intelligent network transactions capabilities format.

17. The apparatus of claim 13, wherein the generating the media server instruction message in the third format includes generating the media server instruction message in an advanced intelligent network transactions capabilities format.

18. The apparatus of claim 13, wherein the translating the attribute of the media server instruction message in the second format into a media server instruction message in the fourth format includes translating the attribute of the media server instruction message in diameter-plus format to a media server instruction message in a session initiation protocol invite format.

19. The apparatus of claim 14, wherein caller-entered data is received at the media server in response to the announcement.

20. The apparatus of claim 19, wherein the caller-entered data is processed at the media server to generate a validation message in a fifth format and including the caller-entered data.

* * * * *